United States Patent [19]
Chandler

[11] Patent Number: 4,782,475
[45] Date of Patent: Nov. 1, 1988

[54] FLEXURE SUPPORTED READ HEAD

[75] Inventor: Jasper S. Chandler, Rochester, N.Y.

[73] Assignee: Eastman Kodak Company, Rochester, N.Y.

[21] Appl. No.: 944,128

[22] Filed: Dec. 22, 1986

[51] Int. Cl.$^4$ .............................................. G11B 7/095
[52] U.S. Cl. ........................................ 369/45; 369/44; 369/112
[58] Field of Search ................... 369/44, 45, 46, 112; 350/6.3, 255; 250/201 DF

[56] References Cited

U.S. PATENT DOCUMENTS

| 4,592,037 | 5/1986 | Ohnuki | 369/44 |
| 4,616,355 | 10/1986 | Kasahara | 369/45 |

FOREIGN PATENT DOCUMENTS

| 57-100630 | 6/1982 | Japan | 369/44 |
| 2132034 | 6/1984 | United Kingdom | 369/45 |

Primary Examiner—Donald McElheny, Jr.
Attorney, Agent, or Firm—Warren W. Kurz

[57] ABSTRACT

The optical element assembly in a read head device is supported by a single four-member flexure structure that prevents the assembly from tilting while providing for tracking movement about an axis spaced from the optical element and for focusing movement along the direction of that axis. Preferably, the flexure structure is symmetrical and comprised of identical flexure members to optmize resonance characteristics and the center of mass of the optical element assembly is coincident with the pivot axis to isolate that element from inertial forces resulting from positioning movement of the read head device.

11 Claims, 1 Drawing Sheet

FLEXURE SUPPORTED READ HEAD

FIELD OF THE INVENTION

The invention relates to a read head assembly for reading information on a track of a record member. More particularly, the invention relates to means for supporting an optical element subassembly of the head assembly for tracking and focusing movement.

DESCRIPTION OF THE PRIOR ART

To read the information stored on an optical disk, a detector head assembly, which has no physical contact with the disk, includes an optical element that focuses a spot of light on a track of the rotating disk and detects the modulation of the light by the disk to provide an output signal. Because the tracks of high-density optical recording disks are very narrow and closely spaced, a tracking device employs optical means to sense the track segment being read and uses a servomechanism to maintain precise alignment between the optical element and that track segment. A positioning mechanism moves the entire head assembly in radial relation to the disk to locate the optical element in approximately its required position and the tracking device then adjusts the optical element subassembly relative to the head assembly to achieve the required precise tracking alignment.

Because the recording surface of the disk does not rotate in a perfectly flat plane, the focus condition of the lens is also monitored and a servomechanism is likewise employed to maintain proper focus adjustment of the lens by moving the optical subassembly relative to the head assembly.

In prior art devices of this type, the subassembly comprising a lens or other adjustable optical element is supported for bidirectional movement by conventional bearings, by resilient flexure members, or by a combination of both. Each of such arrangements has certain advantages and disadvantages, but the present invention is directed exclusively to the type of device employing only flexures, which is very advantageous if primary considerations include avoiding hysteresis or the so-called "stick-slip" phenomena, minimizing complexity and mass and simplifying the analysis and control of resonance phenomenon.

Notwithstanding the foregoing potential advantages of optical head devices employing only flexure supports, many prior devices of this general type have failed to take full advantage of these characteristics. For example, if the objective lens is supported for lateral (tracking) adjustment by a flexure device, many such designs do not prevent inertial forces caused by the positioning movement of the entire head assembly from inducing oscillating lateral movement to the optical element subassembly, which interferes with the much more delicate tracking adjustment operation. Similarly, in some such flexure designs, the tracking and focusing modes of movement are not completely independent. In other words, focusing movement tends to produce tracking movement and vice versa. These and similar problems are particularly bothersome in cases in which the subassembly is capable of moving in a mode other than the two specific movement modes dictated by tracking and focusing requirements. Furthermore, some of the prior art flexure designs make it difficult if not impossible to provide a commercially practical structure in which crucial resonance characteristics can be controlled within acceptable limits. This is particularly true in the case of those designs that employ flexure elements that are dissimilar or subjected to dissimilar forces or loads. Basically, it is preferable that the lowest resonant frequency of the system should be higher than any normally encountered tracking or focus frequency and that the same should be true of any harmonics generated within the system. At the same time, it is also preferable that there be sufficient difference between the respective resonant frequencies of the device in its tracking and focusing modes of movement, to prevent mutual excitation.

An example of a rather typical flexure type prior art head assembly that avoids or minimizes some, but not all of the previously mentioned difficulties, is disclosed in FIGS. 7-10 of U.S. Pat. No. 4,135,083. In this assembly, a lens barrel is mounted to a support member by two pairs of crossed leaf flexure springs, the coaxial intersections of which define a pivot axis parallel to the lens barrel to allow tracking movement of the lens barrel relative to the support member. Because the tracking flexure members are very wide relative to their thickness, they are substantially inflexible in the direction of their respective widths, and therefore cannot provide for focusing adjustment. Consequently, the support member, in turn, is mounted to a main support frame by two wide parallel leaf flexure springs that allow translational focusing movement of the lens barrel along its axis while retaining the perpendicularity of the lens axis relative to the recording surface.

Although this design is superior to many analogous structures in the prior art, it nevertheless has several disadvantages, namely: the necessity for more flexure and support elements than are actually required, as will be more clearly evident from the description of the present invention; the apparent difficulty in achieving a desirably high resonant frequency, particularly in the focusing mode of movement, because of the relatively long lever arm and the relatively large combined mass of the lens subassembly and the support frame; possible difficulties in avoiding undesirable interactions between focusing and tracking movements; potential resonance problems attributable to combining two separate flexure systems by means of the support frame; and the previously mentioned problem of tracking movement being inertially induced by positioning movement.

SUMMARY OF THE INVENTION

In accordance with the present invention, these and other deficiencies of prior art designs are overcome by a simple and economical read head device in which the optical element assembly is supported by a single four-member flexure structure that prevents the assembly from tilting while providing for tracking movement about an axis spaced from the optical element and for focusing movement along the direction of that axis. Preferably, the flexure structure is symmetrical and comprised of identical flexure members to optimize resonance characteristics and the center of mass of the optical element assembly is coincident with the pivot axis to isolate that element from inertial forces resulting from positioning movement of the read head device.

BRIEF DESCRIPTION OF THE DRAWINGS

In the detailed description of the preferred embodiments of the invention presented below, reference is made to the accompanying drawings.

DESCRIPTION OF THE ILLUSTRATIVE PREFERRED EMBODIMENTS

Figure 1:
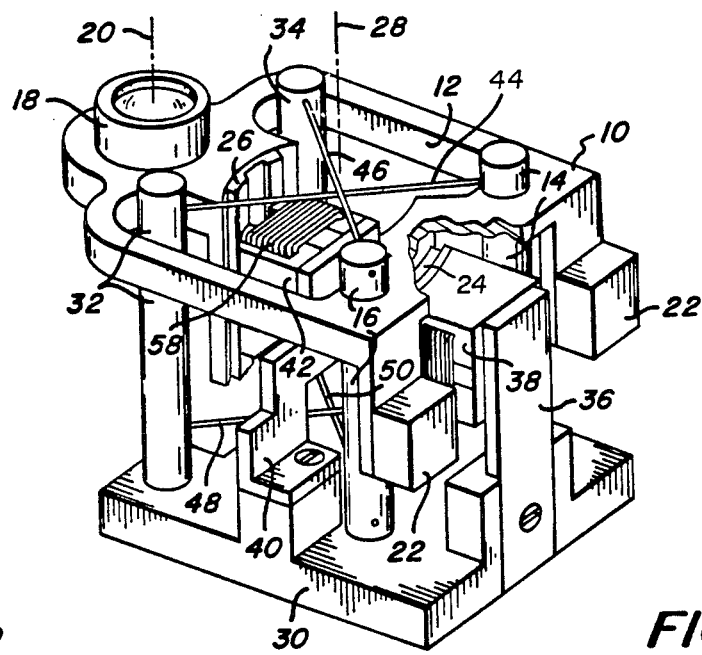
FIG. 1 is a perspective view of a flexure supported read head device according to a preferred embodiment of the present invention.
Figure 2:
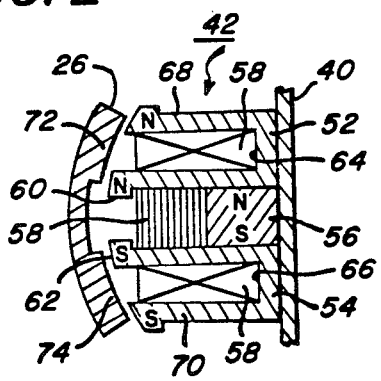
FIG. 2 is an enlarged top cross sectional view of the tracking motor incorporated in the device depicted in FIG. 1.
Figure 3:
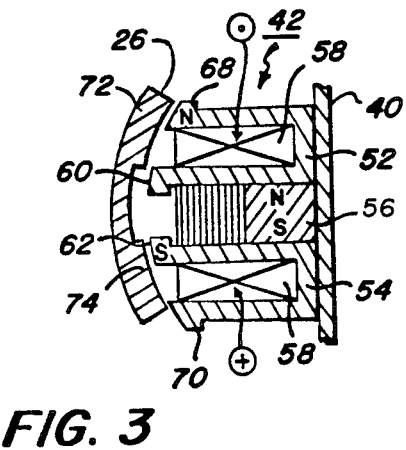
FIG. 3 corresponds to FIG. 2 but illustrates the condition of the motor when it is energized by current of a predetermined polarity.

The preferred embodiment of a read head device shown in FIGS. 1-3 of the accompanying drawings basically comprises an optical element assembly, a frame assembly, and the flexure structure by which the former is supported from the latter.

The optical element assembly comprises a rigid support member 10 provided with a central opening 12 and with a pair of depending support legs 14 and 16. The support member 10 is made of a strong, non-magnetic and relatively lightweight material, such as aluminum or fiber reinforced plastic. A lens assembly 18, defining an optical axis 20, is carried at one end of the support member and a pair of counterweight members 22 are carried at the opposite end thereof. Within the central opening 12, the support member also includes a pair of depending arcuate armature members 24 and 26, each of which is concentric with a vertical axis designated by numeral 28. The entire depicted device is generally symmetrical about a plane defined by the two axes 20 and 28.

The frame assembly is also made of a strong non-magnetic material, and comprises a base plate 30 provided with a pair of ascending support legs 32 and 34 that extend through opening 12 in member 10. A non-magnetic mounting arm 36, attached to the base plate 30, supports a focusing motor field assembly 38 adjacent the convex face of armature member 24, and a non-magnetic mounting bracket 40, attached to base plate 30, similarly supports a tracking motor field assembly 42 adjacent the concave face of armature member 26.

The four-bar flexure structure by which the optical element assembly is mounted to the frame assembly comprises four omnidirectionally flexible flexure bars in the form of identical substantially straight wires 44, 46, 48, 50, which are made of a strong and resilient material such as so-called "piano wire." Each wire is rigidly attached at one end to one of the legs 14 or 16 of the support member and to the diagonally opposite leg 32 or 34 of the frame assembly to provide upper and lower crossed wire flexures in parallel and mutually aligned relation to one another. The mutually aligned upper and lower wires 46 and 50 are respectively spaced slightly above and below the adjacent wires 44 and 48. As is well known in the flexure art, the line passing through the crossing points of the upper and lower sets of wires defines an effective pivot axis about which the optical element assembly can rotate through a small angle. This axis is coincident with the previously mentioned axis 28 of the armature members 24 and 26. Because the angle of rotation is relatively small, the flexure structure provides the functional equivalent of a mechanical pivot but with the advantage of being free of friction and slip-stick hysteresis and by being self-biasing toward a neutral position. The parallelism between the upper and lower pairs of crossed wires provides the equivalent of another well known type of flexure in which two parallel cantilevered flat springs support a member for movement in the direction of flexure of the springs while maintaining it parallel to its original position. Accordingly, the optical element can move resiliently upwardly or downwardly to focus the lens but the latter cannot tilt. Although the lens axis is always parallel to its original position, it does move slightly closer to support legs 32 and 34 as it moves away from its neutral position, but this resulting slight shifting of the optical axis along the direction of the recording track being read, is minuscule and of no consequence.

Although the optical element assembly is thus free to move rotationally for tracking adjustment and vertically for focusing adjustment, any other mode of movement is precluded within the limits of the ability of the structural elements of the device to resist bending of the frame or support members or stretching of the flexure wires. In other words, in terms of classic kinetic design theory, any body has only six possible modes of movement, i.e. translational movement along three orthogonal axes and rotational movement about three orthogonal axes. In the present case, the particular arrangement of the flexure elements dictates that the only possible movements of the optical element assembly are the one mode of translational focusing movement and the one mode of rotational tracking movement.

By balancing the optical element assembly so that its center of mass is coincident with its rotational axis, inertial forces arising from lateral positioning movements of the entire read head assembly are prevented from inducing any rotational or tracking movement of the optical element assembly relative to the frame member.

To increase the stiffness and hence the resonant frequency of the flexure structure, it is preferable, rather than simply increasing the diameter of the flexure wires, to employ wires or bars that are stiffer in their central regions, and that therefore flex predominately only near their ends. Such a flexure bar can be made by several processes, e.g., by telescoping a tube over the central portion of a wire and sweating or otherwise bonding it to the wire, by selectively applying a stiffening electro-deposited metal layer to the central portion of the wire, or, by reducing the cross section of the end portions of a wire by electrical or chemical etching. Also, the stiffness and resonant frequency of the device can be selectively controlled for both the tracking and focusing modes of movement by using flexural bars that are stiffer in one direction then in a direction at right angles thereto. For example, if the flexure bars are of rectangular or oval cross section with the major cross section axis located vertically, each wire will be stiffer in its focusing mode of flexure than in its tracking mode of flexure.

As is most clearly shown in FIGS. 2 and 3, the field assembly 42 of the tracking motor is generally horseshoe shaped and comprises a pair of slotted pole pieces 52 and 54 made of a magnetically permeable material, e.g., soft iron or sintered ferritic material, the pole pieces 52 and 54 are located symmetrically in contact with the respective north and south poles of a strong rectangular permanent magnet 56 and are maintained in position by being bonded or otherwise rigidly attached to the magnet and/or the mounting bracket 40. Alternatively, the file assembly comprising the two pole pieces and the permanent magnet might be formed as a unitary one-piece structure. A rectangular coil 58 comprises many turns of insulated wire wrapped around the inner field poles 60 and 62 of pole pieces 52 and 54 and substantially filling the corresponding pole piece slots 64 and 66.

When no current is flowing in coil 58, magnet 56 causes both the outer field pole 68 and the inner field pole 60 of pole piece 52 to exhibit north magnetic polarity and both the outer field pole 70 and the inner field pole 62 of pole piece 54 to exhibit south magnetic polarity. Consequently, as depicted in FIG. 2, the armature is magnetically attracted to its central position in which the vertically disposed armature poles 72 and 74 are respectively centered in relation to the two poles of the adjacent pole pieces 52 and 54; thus maximizing the density of the magnetic flux in the gaps between the armature pole and the corresponding pole pieces.

When current flows in coil 58 in a counterclockwise direction as viewed from the bracketed end of the tracking motor, i.e., when the direction of the current flow with respect to FIG. 3 is "into the paper" ($\oplus$) in pole piece 54 and "out of the paper" ($\odot$) in pole piece 52, the resulting electromagnetic field reinforces or intensifies north polarity of field pole 68 and the south polarity of field pole 62, both produced by magnet 56, and counteracts the similarly produced north polarity of field pole 60 and south polarity of field pole 70; thereby causing the armature to be displaced in a clockwise direction as shown in FIG. 3. Similarly, when the current in the coil flows in the opposite direction, the armature will likewise be magnetically displaced in the opposite direction.

If the current flow shown in FIG. 3 where sufficient to essentially neutralize the polarity of field poles 60 and 70, the armature would move to a position at which armature poles 72 and 74 would be substantially aligned with the centers of the respective north and south field poles 68 and 62. In practice, however, the current flow is preferably limited such that the maximum armature movement, in both directions, is always somewhat less than half the width of the field poles, as shown in FIG. 3. In this range of movement, the armature displacement is substantially linear with respect to the current flow, whereas, significant non-linearity may occur if a greater range of movement is employed. Because the focusing movement of support member 10 moves armature 26 vertically relative to pole pieces 52 and 54, the armature poles 72 and 74 extend sufficiently above and below the pole pieces to be in confronting relation thereto regardless of the focusing condition of the read head device.

Figure 4:
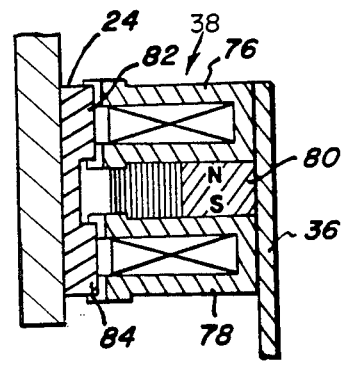
FIG. 4 is an enlarged frontal cross-sectional view of the focus motor incorporated in the device depicted in FIG. 1.

The focusing motor 38, shown in FIG. 4, is basically similar to the previously described tracking motor 42, comprising a pair of pole pieces 76 and 78 supported by mounting arm 36 in contact with adjacent faces of a permanent magnet 80 and spaced from respective horizontal armature poles 82 and 84 of armature member 24. In this case, however, because the motor causes its armature to move vertically along a substantially straight line, the curvature of the confronting armature and field pole faces accommodates the movement induced by the tracking motor 42 rather than that induced by the focusing motor 38.

Figure 5:
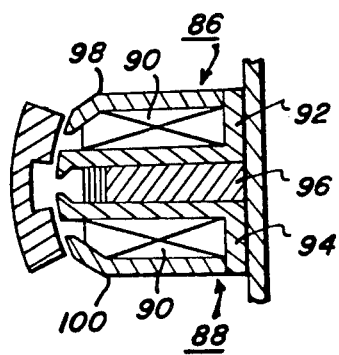
FIG. 5 is a cross-sectional view of a more compact version of a motor similar to those shown in the preceeding figures.

It should be understood that the motors illustrated in FIGS. 2, 3 and 4 are illustrative only and that more compact motors with different movement ranges can be designed. For example, FIG. 5 illustrates a modification of the focusing motor shown in FIG. 2, in which the pole pieces 86 and 88 are each made in two pieces to permit the coil 90 to be wound after the inner pole piece members 92 and 94 have been attached to the permanent magnet 96, but before the respective outer pole piece members 98 and 100 are bonded or otherwise fastened in place; thereby reducing the overall size of the motor assembly by allowing the field poles to be located in closer proximity to each other, without reducing the effective size of the electromagnetic coil. Regardless of such specific design features, however, a tracking or focusing motor of the basic configuration described above has the advantage of being simple, compact, relatively inexpensive, powerful, easily assembled, and reliable. Of particular significance is the fact that, in such a motor, the coil is immovable, which prevents it from contributing to the movable mass of the motor and also eliminates the need for fragile flexible connecting wires. Furthermore, the arrangement of the coil inherently provides good heat dissipation. Additionally, because the net magnetic attractive force tending to pull the armature into contact with the pole pieces is substantially constant, different modes or levels of motor energization do not significantly influence the resonance characteristics of this device. In the latter regard, it should also be noted that in the illustrative embodiments both motors attract their respective armatures in the same direction, i.e., in the direction in which the flexure bars are under tension rather than compression, thus increasing the natural resonant frequency of the device and absorbing the attractive force in the direction in which the device is most resistant to deformation. However, alternative motor arrangments can be employed to achieve greater compactness or power. For example, a pair of oppositely facing tracking motors might be combined with a pair of oppositely facing focusing motors located at right angles to the tracking motors to effectively double the available motor power while balancing the attractive forces tending to pull the armatures toward the respective pole pieces. Alternatively, it is also possible to achieve greater compactness and weight reduction by allowing a single permanent magnet to magnetize the pole pieces of more than one motor assembly.

The electrical circuitry employed to energize the tracking and focusing motors has not been specifically disclosed or described, but many examples of such circuitry are well known in the prior art. In addition to its basic functions of maintaining the lens in proper focus and in its proper tracking position, such circuitry can also serve to dampen resonant vibrations, to compensate for off-axis optical phenomena and to lock the tracking position of the lens during rapid positioning movement of the read head assembly.

Although the invention has been described with particular reference to presently preferred embodiments thereof, it will be understood that variations and modifications can be effected within the spirit and scope of the invention as described above and as defined in the appended claims.

I claim:

1. An optical read head comprising a movable support member, an optical element carried by said movable support member, a base member, and flexure means connecting said support member to said base member, said flexure means comprising four, non-elastic, omnidirectionally flexible flexure bars, each of which is attached at one end to said support member and at its other end to said base member, two of said bars extending diagonally between said members in a first direction and the other two of said bars extending diagonally between said members in crosswise relation to said first two bars, whereby the flexibility of said bars allows a rotational mode of movement of said support member relative to said base member about an effective pivot axis located along a line intersecting all four bars, said bars lying in planes substantially parallel to one another and perpendicular to said pivot axis, whereby the flexibility of said bars allows a translational mode of movement of said support member relative to said base member along the direction of said pivot axis; said support member being constrained by said bars against any other modes of movement relative to said base member.

2. The invention defined by claim 1 in which said flexure bars are substantially identical.

3. The invention defined by claim 1 in which the center of mass of said support member is substantially coincident with said effective pivot axis.

4. The invention defined by claim 1 including motor means for selectively inducing movement of said support member in its rotational and translational modes of movement.

5. The invention defined by claim 4 in which the movement inducing forces produced by said motor means exert tension on said flexure bars.

6. An optical read head comprising a movable support member, an optical element carried by said movable support member and defining an optical axis, a base member, and flexure means connecting said support member to said base member, said flexure means comprising four, non-elastic, omnidirectionally flexible flexure bars disposed in respective, generally parallel planes substantially perpendicular to said optical axis, each of said bars being attached at one end to said support member and at its opposite end to said base member, said flexure bars being arranged in crossed pairs with the effective pivot axis defined by a line intersecting the center portions of all four bars being substantially parallel to said optical axis, whereby flexibility of the four flexure bars provides the support member with a first mode of movement rotational about said pivot axis and with a second mode of movement substantially parallel to said pivot axis.

7. The invention defined by claim 6 in which said four flexure bars are substantially identical.

8. The invention defined by claim 6 in which said flexure means defines two intersecting planes, each including two of said flexure bars, said effective pivot axis being located along the intersections of said two planes.

9. The invention defined by claim 6 in which the center of mass of said support member is substantially coincident with said effective pivot axis.

10. An optical read head comprising a base member, a support member, and flexure means connecting said support member to said base member, said flexure means comprising four, non-elastic, omnidirectionally flexible flexure elements located respectively in mutually parallel planes with two of said elements being located in each of two mutually intersecting planes that are generally perpendicular to said mutually parallel planes and that define an effective pivot axis along their line of mutual intersection, said flexure elements being attached by their corresponding ends to said support member and at their opposite ends to said base member.

11. The invention defined by claim 10 in which the center of mass of said support member is substantially coincident with said effective pivot axis.

* * * * *